(12) United States Patent
Sander

(10) Patent No.: US 6,499,515 B2
(45) Date of Patent: Dec. 31, 2002

(54) GAS CUSHION PROPORTIONING MICROSYSTEM

(75) Inventor: Dietmar Sander, Hamburg (DE)

(73) Assignee: Eppendorf AG, Hamburg (DE)

( * ) Notice: Subject to any disclaimer, the term of this patent is extended or adjusted under 35 U.S.C. 154(b) by 0 days.

(21) Appl. No.: 09/843,414

(22) Filed: Apr. 26, 2001

(65) Prior Publication Data

US 2002/0011276 A1 Jan. 31, 2002

(30) Foreign Application Priority Data

Apr. 28, 2000 (DE) ......................................... 100 22 398

(51) Int. Cl.⁷ ................................................. B65B 1/04
(52) U.S. Cl. ....................... 141/59; 141/192; 141/301; 222/282; 222/422
(58) Field of Search ............................ 141/59, 95, 192, 141/285, 301, 302; 222/55, 71, 72, 630, 282, 422

(56) References Cited

U.S. PATENT DOCUMENTS

| | | | | |
|---|---|---|---|---|
| 4,459,267 A | * | 7/1984 | Bunce et al. ................. | 222/207 |
| 6,039,211 A | * | 3/2000 | Slater et al. .................... | 141/1 |

\* cited by examiner

Primary Examiner—Steven O. Douglas
(74) Attorney, Agent, or Firm—Sidley Austin Brown & Wood, LLP

(57) ABSTRACT

A gas cushion proportioning microsystem to proportion liquid volumes in the microliter and sub-microliter ranges, comprising a liquid reservoir including a storage space for the liquid being proportioned the boundary line of which is broken through by an outwardly leading liquid passage and a gas passage, a gas displacement system which has a micropump to pump a gas and a connection to the gas passage, and a proportioning control in an operative communication with the micropump to generate a negative pressure or positive pressure by actuating the micropump and to apply the negative pressure or positive pressure to the liquid reservoir in order to receive liquid in the storage space through the liquid passage or to deliver it from said space.

51 Claims, 9 Drawing Sheets

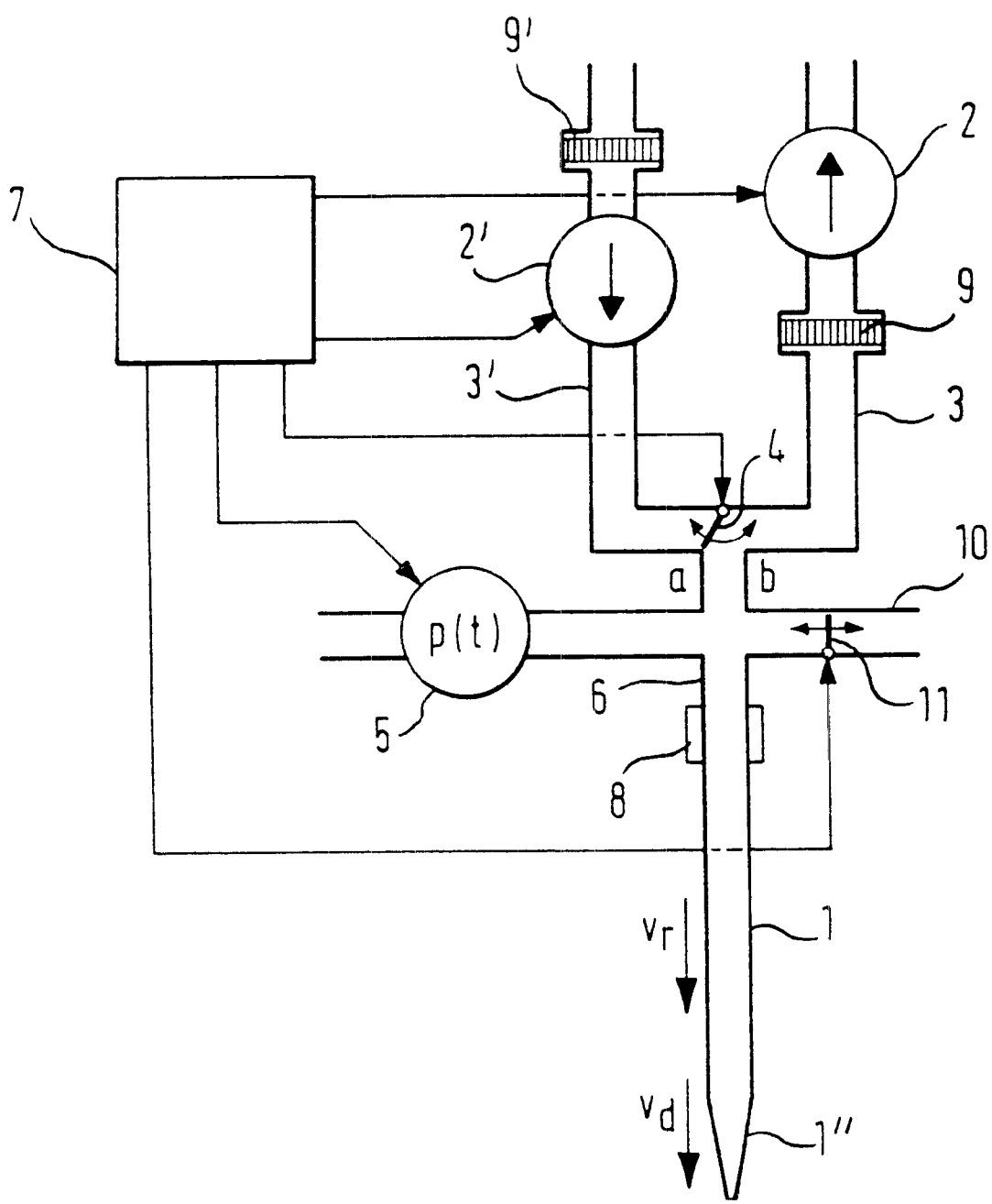

GAS CUSHION PROPORTIONING MICROSYSTEM

This invention relates to a gas cushion proportioning microsystem to proportion extremely small liquid volumes in the microliter and sub-microliter ranges.

In the known proportioning systems, a rough distinction is made between pipettes, dispensers, and multi-functional proportioners. Pipettes will redischarge the liquid volume received in one step. In dispensers, the discharge of the liquid volume received is performed stepwise. Multi-functional proportioners allow for both modes of operation. All of the system types also exist in a multi-channel design and permit to simultaneously perform several identical proportioning operations.

Conventional reciprocating-piston pipettes are designed as fixed-volume or adjustable-volume pipettes and operate in a volume range from somewhat less than 1 $\mu$l up to about 10 ml. A piston is displaced in a cylinder, which moves a gas cushion in order to draw a liquid specimen into a pipette tip or to eject it therefrom. This has the advantage that the liquid does not come into contact with the reciprocating-piston pipette, but only contaminates the pipette tip. Therefore, this one mostly is designed as an expendable article (a "disposable"), particularly in plastic, and will be exchanged against a clean pipette tip after use.

Proportioning by means of reciprocating-piston pipettes is burdened with various system-related errors. In adjustable-volume reciprocating-piston pipettes, a pipetting error arises by the fact that the weight of the liquid column "is suspended" from the gas cushion and stretches it differently depending on the liquid volume adjusted. It is particularly for minor volumes being proportioned that proportioning accuracy is significantly affected because the pipette tip is wetted by the liquid being proportioned. Moreover, reciprocating-piston pipettes are incapable or only of a restricted capability of using open jets for small volumes being proportioned. No complete liquid discharge in an open-jet is reached already if the volumes being proportioned are of a few microliters and less. In addition, it is just for small volumes being proportioned that the reception of liquid considerably depends on the depth of immersion of the pipette tip into the liquid and the alignment of the reciprocating-piston pipette. This can be a significant source of errors especially in hand-operated pipettes. As a result, conventional reciprocating-piston pipettes are able to pipette small volumes only to a limited extent and at a relatively high imprecision and incorrectness.

Conventionally designed proportioning systems operating according to the direct-displacement principle include tips referred to as "syringes" with an integrated piston which is coupled to a driving device of the proportioning system. They are employed in a volume range from about 1 $\mu$l to 50 $\mu$l. Since there is no gas cushion and the piston is in a direct contact with the specimen being pipetted direct displacers are employed particularly if liquid of high vapour pressures, high viscosities or high densities is proportioned. This system type avoids the error resulting from the varying stretch of the gas cushion. However, proportioning small volumes at the accuracy required will be possible at best down to about 1 $\mu$l. Also, direct-displacement syringes which can proportion such liquid volumes in an open jet are relatively expensive.

From WO 99/10099, a proportioning microsystem is known which comprises a reservoir, a membrane micropump the inlet of which is joined to the reservoir, an open-jet proportioner the inlet of which is joined to the exit of the membrane micropump, a proportioning port joined to the exit of the open-jet proportioner, and a proportioning control disposed in an operative communication with the membrane micropump and the open-jet proportioner. The membrane micropump is capable of pumping liquid into the open-jet proportioner from the reservoir. The open-jet proportioner is capable of dispensing the pumped-in liquid in an open jet. The open-jet capability makes it possible to proportion volumes being proportioned without no carry-over in the range of 1 nl up to a few microliters at high proportioning accuracies. If proportioning is to be made with another liquid this direct-displacement proportioning microsystem either needs to be cleaned to avoid carry-overs or to needs to be exchanged against a clean proportioning microsystem.

The same document has made known a microproportioning apparatus which has a membrane micropump which displaces a column of auxiliary liquid which, by means of a pipette piston, draws liquid into a pipette tip through a proportioning port or ejects it therefrom. The desired volume being proportioned is reached via the control of the known stroke volume of the membrane micropump. After a proportioning operation, the pipette tip and some of the column of auxiliary liquid may be discarded. In this system, the liquid flows off through the proportioning port and may be deposited on a substrate. It is impossible to deliver liquid in an open jet. Errors may occur particularly owing to wetting effects and, further, by differing depths of immersion and alignments. Therefore, its usability for proportioning extremely small liquid volumes is limited. In addition, there is a risk of contaminations because the pipette tip and the substrate contact each other.

Accordingly, it is the object of the invention to create a proportioning microsystem to proportion extremely small volumes in the microliter and sub-microliter ranges at an increased accuracy and a reduced risk of contamination and carry-over.

The object is attained by a gas cushion proportioning microsystem according to claim 1. Advantageous aspects of the system are indicated in the sub-claims.

The inventive gas cushion proportioning microsystem to proportion liquid volumes in the microliter and sub-microliter ranges comprises 1.1 a liquid reservoir including a storage space for the liquid being proportioned the boundary line of which is broken through by an outwardly leading liquid passage and a gas passage.

1.2 a gas displacement system which has a micropump to pump a gas, and a connection to the gas passage, and 1.3 a proportioning control disposed in an operative communication with the micropump to generate a negative pressure or positive pressure by actuating the micropump, and to apply the negative pressure or positive pressure to the liquid reservoir in order to receive liquid in the storage space through the liquid passage or to deliver it from said space.

A proportioning microsystem in the sense of the present application is a proportioning system which serves for proportioning small liquid volumes in the microliter range and sub-microliter range (from abt. 50 $\mu$l to abt. 1 nanoliter). What is characteristic of such proportioning microsystem is micropumps which are designed in the microsystem technology. Their manufacture in the microsystem technology specifically comprises the use of the following materials: semiconductors and/or plastic and/or glass and/or ceramics and/or metals. Those are processed by means of appropriate manufacturing techniques of the microsystem technology or by microstructuring them, e.g. by lithography and etching processes (for semiconductors) or LIGA processes (for metals, plastics, and ceramics).

The micropump concerned may specifically be a membrane micropump. A membrane micropump in the sense of the present application is a pump with a cavity which is defined by at least one membrane with which an actuator (a drive) is associated. The actuator may specifically be a piezoelectric actuator. However, other actuators may be employed as well, e.g. thermal-action actuators. A membrane micropump may be with no valve so as to act as a displacement device to displace a volume during a stroke. However, it may be equipped with valves which are switched in such a way that several successive strokes of the membrane produce a volume flow. Passive-response valves, which are controlled by the pressures applied, generally allow of a unidirectional operation of the membrane micropump, i.e. a volume flow in one direction only. Active-response valves which are purposefully switched by a control device also allow of a bidirectional operation of the membrane micropump, i.e. a volume flow in different directions.

Other designs of the micropump may also be employed, particularly a gear micropump, an impeller micropump or a diffusion air micropump.

The invention is based on the displacement of a gas cushion (particularly an air cushion) by means of a negative-pressure or positive-pressure gas discharge. In the proportioning microsystem, to this end, a gas reservoir is "produced" by a negative pressure or positive pressure, which may be some 100 mbar, by means of a gas-delivering micropump. The negative pressure or positive pressure may precisely be controlled via the pumping rate (i.e. the volume flow delivered) of the micropump or the volume displaced thereby. The dependence of the pumping rate or the volume displaced on micropump actuation is known or can be determined also for other designs of the micropump.

Generally, the negative pressure or positive pressure generated by the micropump may act directly on the liquid reservoir. The connection between the gas displacement system and the liquid volume may be designed with no valve means here. i.e. may be permanently continuous. Then, the negative pressure or positive pressure will be applied to the liquid reservoir by actuating the micropump. The micropump may be designed without valves or with valves here. A high positive pressure or negative pressure may be provided for specifically by an appropriately sized effective displacement area (e.g. a membrane area) of the micropump (on one or several membranes, for example). It is preferred that the connection has valve means. A particularly high negative pressure or positive pressure may be developed by blocking the valve means and actuating the micropump. If the valve means are opened the liquid reservoir may be acted on by the negative pressure or positive pressure, which causes liquid to be received in or to be delivered from the liquid reservoir. The valve means inside the connection or more valve means in an ventilation duct branching off therefrom may be active-response valves of the micropump at the same time.

Preferably, a gas reservoir of the gas displacement system is "charged" by the micropump with a negative pressure or positive pressure. The gas reservoir may specifically be formed in the micropump and/or separately from it. Charging is performed prior to the reception or discharge of liquid. It is preferred that this is accomplished by several membrane strokes of a membrane micropump. Valve means disposed in the connection between the gas displacement system and the liquid reservoir separate the gas reservoir from the liquid reservoir and control pressure discharge into the liquid reservoir.

Unlike in conventional air cushion proportioning systems, proportioning is possible at a very high accuracy because the marginal conditions have been chosen to be particularly favourable and can be fixed precisely: The level of the negative pressure or positive pressure and its precise controllability, namely, make it possible to ensure that wetting or capillary effects the inherent pressures of which are small as compared to the negative pressure or positive pressure are overcome during the reception and discharge of liquid and, therefore, do not impair it. In addition, the positive pressure can be controlled so that liquid discharge may be effected in an open jet and exactly that liquid volume which need to be delivered will be delivered. Inherent variations in the gas filling temperature which are caused by gas discharge are uncritical with respect to the environment because of the differential pressure exclusively causing the reception and discharge. Moreover, this will avoid contaminations and carry-overs because the system operates with a gas cushion and discharge may be effected in an open jet without any contact with the substrate.

For accuracy in proportioning, it is advantageous that the system allows of a precisely timed control in applying the negative pressure or positive pressure to the liquid reservoir, which creates favourable conditions for liquid reception or liquid discharge. In a system using no valve means, this can be reached by controlling the micropump. In a system using valve means, the start of pressure application may be precisely controlled by opening the valve means. Terminating or relieving the negative pressure or positive pressure is possible particularly by closing the valve means because pressure compensation in the low-volume gas cushion still remaining above the liquid volume may be effected very rapidly and may be taken into account in determining or controlling the volume being proportioned. Preferably, the negative pressure or positive pressure may be relieved by opening a valve means in a ventilation connection of the gas displacement system to the environment. Further, it is possible to relieve the negative pressure or positive pressure acting on the liquid volume by means of an oppositely acting negative pressure or positive pressure which may be applied, in particular, by pumps or by connecting an appropriately "charged" gas reservoir.

It is preferred that the liquid reservoir is abruptly applied to by the negative pressure or positive pressure or that the negative pressure or positive pressure is abruptly relieved, which makes it possible to attain that the advantageous pressure conditions prevail from the start to the end of the proportioning operation. The abrupt application or relief of the pressure conditions may be attained, in particular, by an abrupt membrane deformation or an abrupt opening or closure of valve means. Preferably, the negative or positive pressure gas discharge is performed in a pulselike manner and, therefore, is also termed "pulse pressure method". The pulse pressure method permits an increased accuracy in proportioning by employing an increased negative pressure or positive pressure the level which is precisely controllable, in a precisely determinable period of time.

After the abrupt relief of the negative pressure or positive pressure, the abrupt termination of the suction or discharge of liquid is caused by the forces which counteract the inertia forces of the liquid volume. This may be contributed to, in particular, by the frictional forces of the vessel walls of the liquid reservoir which act on the liquid volume as well as by interfacial forces between the boundary of the liquid reservoir and the liquid volume. This can be favoured, in particular, by the conformation, dimensions, and choice of materials for the liquid reservoir. However, it is also possible to cause the abrupt termination of the suction or discharge by applying an additional negative or positive pressure which counteracts the inertia forces and can be provided by means of a pump or gas reservoir. Thus, suction can be abruptly terminated by abruptly relieving the negative pressure and applying a positive pressure, and discharge can be terminated by abruptly relieving the positive pressure and applying a negative pressure. Once the liquid volume is stopped the additional positive or negative pressure may be relieved again. Thus, it is for the first time that it becomes possible to pipette, dispense, and handle extremely small liquid volumes in the microliter and sub-microliter ranges (particularly from 0.1 to 10 µl) by means of a gas cushion system at a high accuracy (e.g. at a proportioning accuracy of 1%). Since the liquid exclusively comes into contact with the liquid reservoir this one may be advantageously designed as a relatively simple disposable which can be replaced with a clean liquid reservoir after use, which avoids carry-overs. By the way, discharging liquid in an open jet makes it possible to transfer liquid volumes with no contact between the system and the substrate, and avoids contaminations. A considerable reduction in reagent consumption is possible as compared to the initially mentioned classico-mechanical pipettes and dispensers and the initially mentioned proportioning microsystem. The invention permits applications especially in filling microtitration plates with extremely small reception volumes, feeding analytical microfluid systems (e.g. for capillary electrophoresis), applying reagents to biochips, etc.

The system is adapted to be used for both receiving and discharging liquid volumes. In an advantageous manner, however, it is adapted to be used exclusively for receiving or exclusively for discharging liquid volumes, e.g. if a determined liquid volume is destined for being processed in the system or gets into the system in another way. Hence, the invention also includes systems which enable both applications or only one thereof.

Each of the liquid volume which is received or discharged may be determined or controlled in different ways. Thus, it is possible to determine by tests under which system conditions (e.g. the level of the negative pressure or positive pressure, the points of time to switch the valve means, the operation or rest of the micropump, the pumping rate or volume displacement of the micropump) a certain volume of a certain liquid will be received or will be discharged by the system. The system may repeat the reception or discharge of this liquid volume at a high accuracy if it is operated under the same system conditions.

Thus, for example, the negative pressure in the gas displacement system and/or the period for which the valve means will open for the pipetting of a desired liquid volume may be controlled just so that the desired liquid volume is received. Further, the positive pressure and the opening period may be controlled just so that this certain liquid volume may be safely discharged in an open jet. At this point, the positive pressure may continue to be applied until the liquid volume is completely ejected. However, it is also possible to control the negative pressure in the gas reservoir and the opening period of the valve means in such a way that at least the liquid volume to be received will be received and, afterwards, to control the positive pressure and the opening period in such a way that exactly the preset liquid volume will be discharged. The latter approach may also be made in dispensing, in which process at least the sum of all liquid volumes to be discharged requires to be received initially. In addition, it may be possible to find the system conditions for the reception or discharge of several determined liquid volumes or determined volumes of several different liquids and to reference to them for the precise reception and discharge of appropriate liquid volumes.

According to an advantageous aspect, the system comprises a pressure sensor which preferably is compensated in temperature to detect the pressure in the gas displacement system with which the proportioning control is in an operative communication in order to determine the liquid volume received or discharged or to control it to a preset value. Thus, the sensor may determine a variation in the negative pressure or positive pressure after the valve means is opened, and may utilize the proportioning control, while making recourse to Boyle's law or another gas condition equation, possibly in conjunction with equations describing the flow behaviour of the gas in the proportioning microsystem, for the calculation of the gas volume change which corresponds to the liquid volume received or discharged. Such determination of the liquid volume, however, may be influenced by fabrication-related variations and, hence, unknown variations of the gas volume in the system. According to the above aspect which is based on the determination by tests of the system conditions for the reception and discharge of determined liquid volumes, this aspect also can solely relate to the reception or discharge or to the reception and discharge of determined liquid volumes.

Particularly advantageous is an aspect according to which the proportioning control regulates the negative pressure or positive pressure in the gas displacement system in drawing in or discharging liquid by detecting the pressure prevailing therein by means of the pressure sensor and controlling the pumping rate or volume displacement of the micropump to a preset value and determines the liquid volume received or discharged via the pumping rate or volume displacement of the micropump which is known at this pressure. This aspect is based on the consideration that the gas volume delivered by the micropump for keeping constant the negative pressure or positive pressure in the gas displacement system corresponds very accurately to the liquid volume received. This makes it possible to advantageously utilize the regulation of the negative pressure or positive pressure to a preset value for the determination or control of each liquid volume which is received or discharged. At this point, the accuracy in proportioning is essentially determined by the accuracy in pressure detection by means of the pressure sensor. According to the above aspects, this aspect also can relate only to the reception or discharge or to the reception and discharge of determined liquid volumes.

The liquid volume to be received or discharged may be firmly predetermined or may be adjustable.

According to another advantageous aspect, the liquid reservoir has a liquid passage which is formed as a nozzle. The nozzle favours the attainment of a speed in the outlet which leads to the formation of an open jet. In addition, the cross-section in the storage space may be dimensioned to be so large that the flow of liquid essentially is of a stopple profile there and residual liquid will not be caused to remain by adhesion on the wall of the storage space. Further, intensified frictional forces may act on the liquid in the region of the nozzle which if the negative pressure or positive pressure is relieved will outweigh the inertia forces of the liquid and suppress any further reception or discharge of liquid. Further, the outlet port of the liquid reservoir, particularly on a nozzle, may be designed to be so small in cross-section that if the surface is hydrophobic the capillary forces will prevent the penetration of liquid into the outlet port up to a significant depth of immersion by a mere immersion thereof into the liquid. This makes it possible to achieve an independence of liquid reception on the depth of immersion that, specifically, is sufficient for portable units. In addition, a hydrophobic surface may avoid any adhesion that possibly exists in the nozzle while liquid is being discharged.

Apart from the micropump, one or several further components of the system may be designed in a microsystem technology, particularly the gas reservoir, the valve means, the proportioning control, the pressure sensor, the further valve means, the liquid reservoir, and all of the connections between the components or between these and the environment. This favours a miniaturization of the system and cost-efficient series production. Besides, the microsystem technological design may ensure that the components work at the desired speediness. In addition, extremely fine structures of a microsystem technological design may be manufactured at the accuracy which is required. It is particularly advantageous to arrange one or more components of the system on a microfluid board which may also comprise connections between the components or with the environment.

Miniaturizing the gas-carrying components of the system, e.g. by a microsystem technological design, is also advantageous because of the reasons which follow: While a negative pressure or positive pressure is applied to the liquid reservoir the negative pressure or positive pressure will abruptly drop because it has spread onto the liquid reservoir from the gas displacement system. This pressure drop should turn out to be as small as possible. In addition, it is also advantageous to design the gas reservoir with a small volume because it will then be easier for the pressure sensor to detect a change in the negative pressure or positive pressure due to liquid reception or discharge and, thus, the determination or control of the liquid volume received or discharged can be carried out more precisely. For these reasons, the dead volume, i.e. that air cushion volume which has spread over several components of the system, preferably will be dimensioned to be approximately equal to the maximum liquid volume to be received.

The invention will now be explained in greater detail with reference to the accompanying drawings of some embodiments. In the drawings, FIG. 1 shows a basic design of the gas cushion proportioning microsystem with a gas reservoir in a roughly schematic illustration;

FIG. 2 shows flow rate profiles in a longitudinal section through the liquid reservoir;

FIGS. 3 a through c show the time response of pressure in the regulating circuit for a liquid of the viscosity (FIG. 3a), a liquid of the double viscosity 2.

(FIG. 3b) and when a liquid stoppage is supported by a negative-pressure pulse (FIG. 3c) in a time-pressure diagram each;

FIG. 5 shows a gas cushion proportioning microsystem using pressure regulation by two membrane micropumps in a roughly schematic illustration;

Figure 6A:
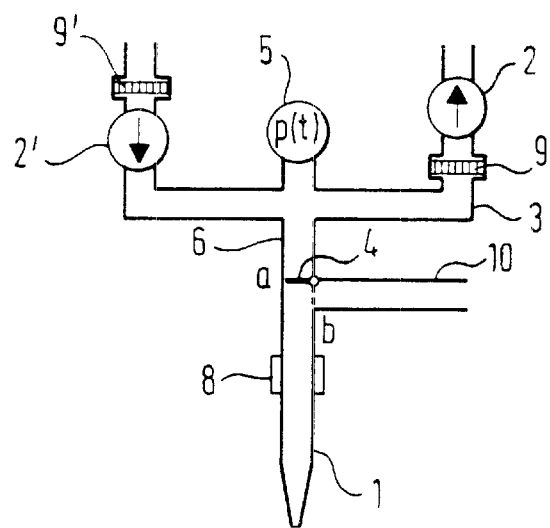
Figure 6B:
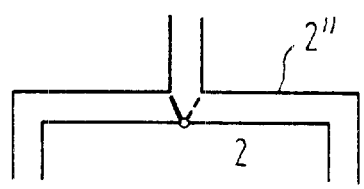
Figure 7:
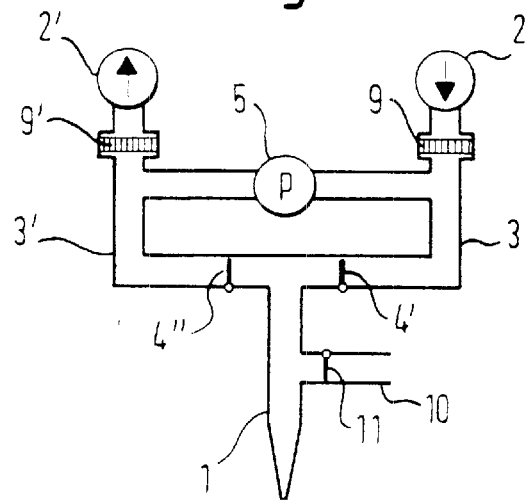
Figure 8:
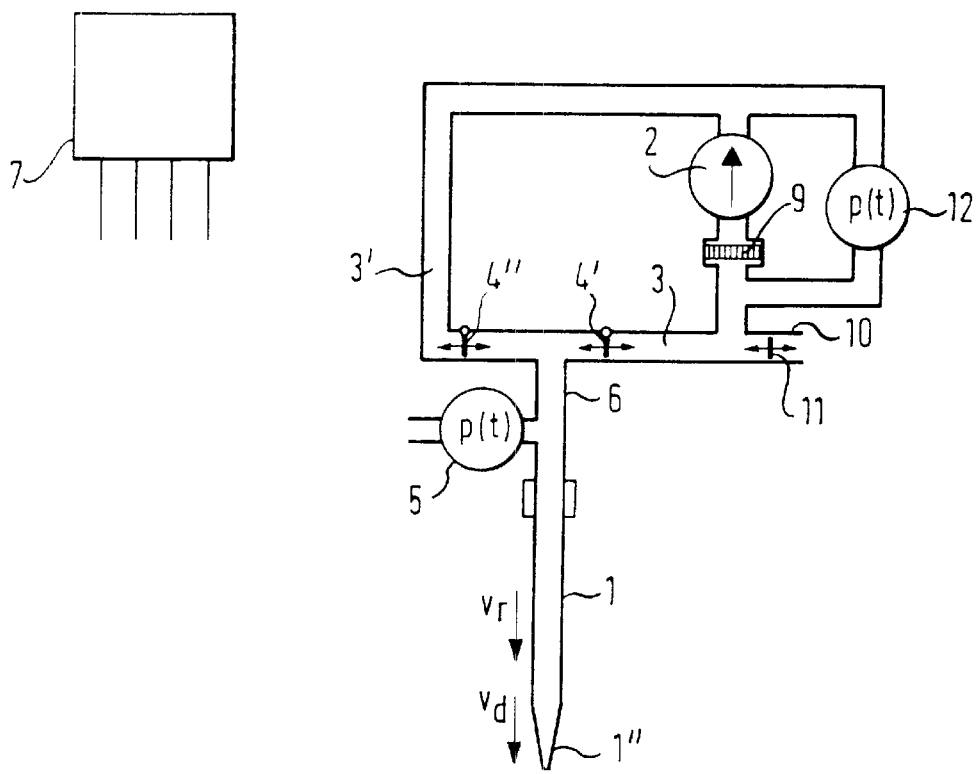
Figure 9:
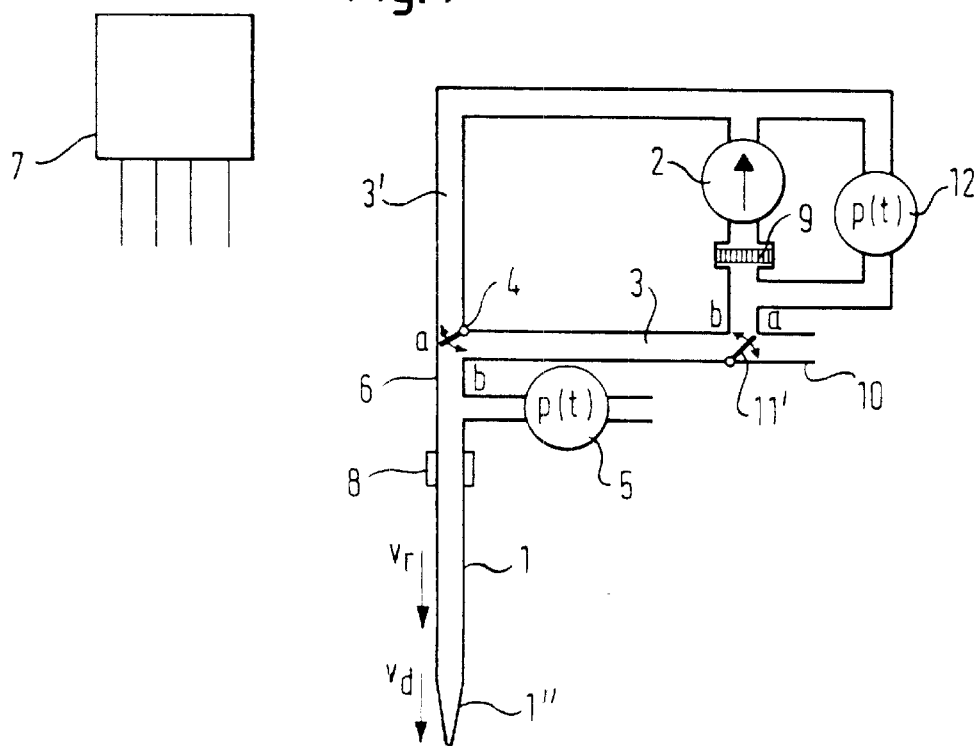
Figure 10:
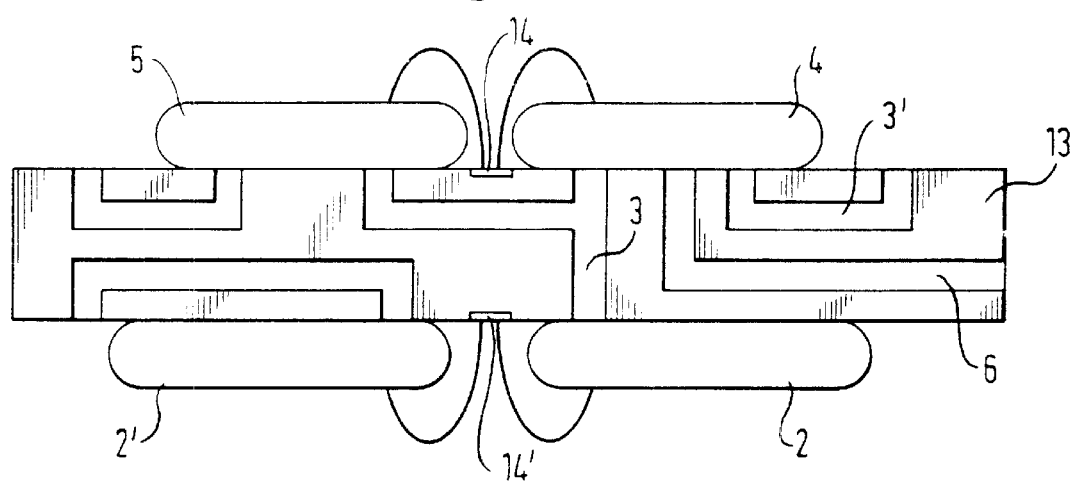
Figure 11:
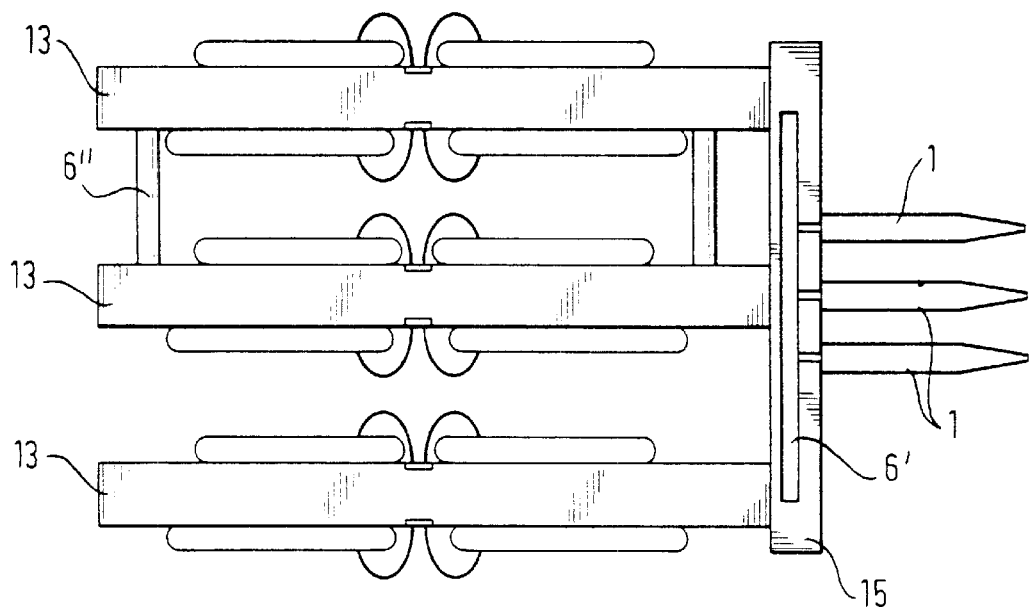
Figure 12:
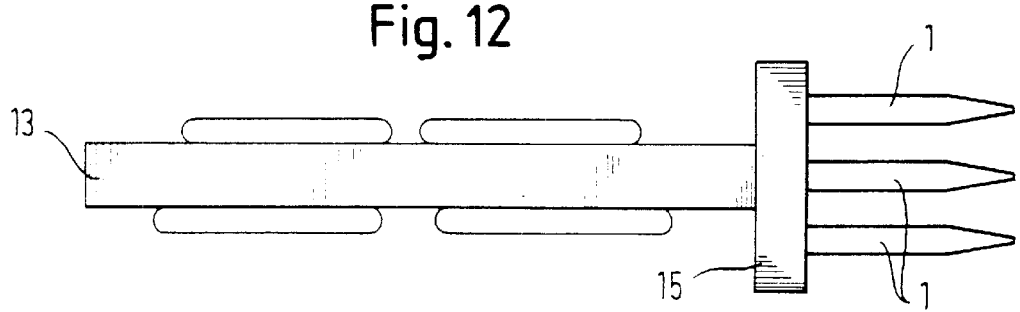
Figure 13:
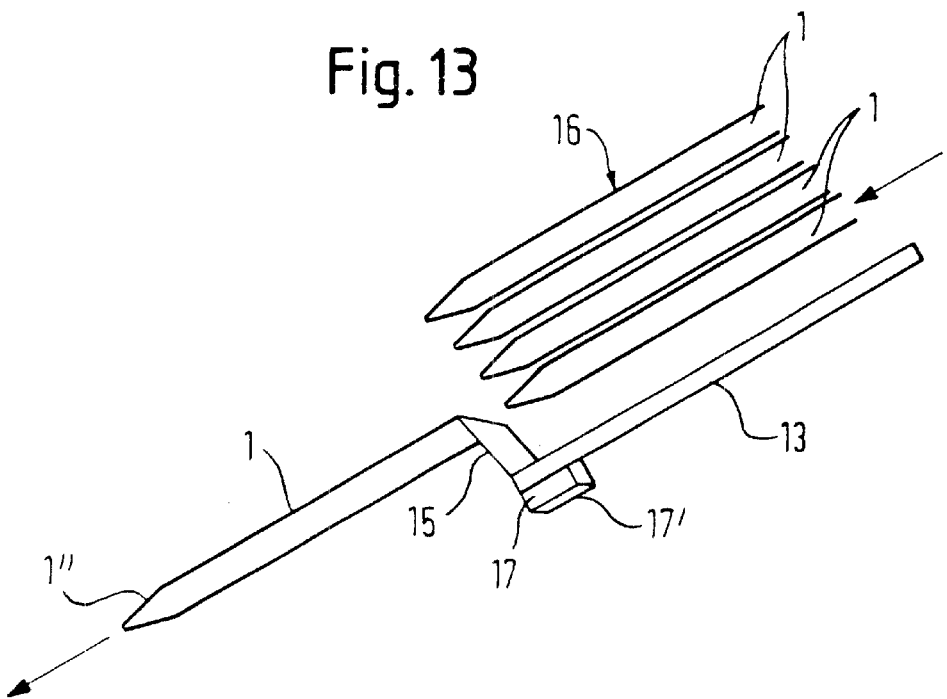
Figure 14:
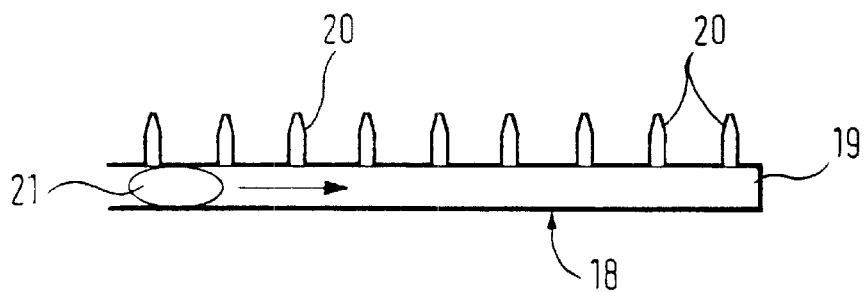
Figure 15:
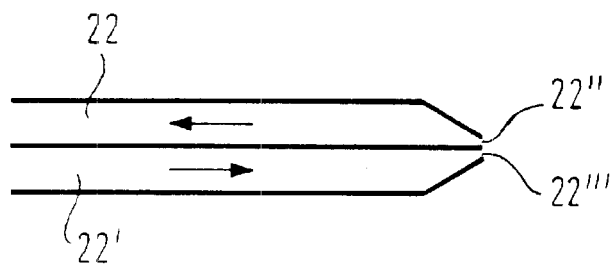

FIGS. 6 a and b show a gas cushion proportioning microsystem using the valve means deviating from the system of FIG. 5 (FIG. 6a) and an additional pressure-maintaining device (FIG. 6b);

FIG. 7 shows a gas cushion proportioning microsystem using the valve means deviating from the system of FIG. 5;

FIG. 8 shows a gas cushion proportioning microsystem using pressure regulation by a single membrane micropump in a roughly schematic illustration;

FIG. 9 shows a gas cushion proportioning microsystem using the valve means deviating from the system of FIG. 6;

FIG. 10 shows a microfluid board in a roughly schematic cross-section;

FIG. 11 shows a modular microfluid system including several microfluid boards and a connection board in a roughly schematic cross-section;

FIG. 12 shows a modular microfluid system including one microfluid board and a connection board for parallel liquid reservoirs in a roughly schematic cross-section;

FIG. 13 shows the magazine feed of a proportioning microsystem including a liquid reservoir reservoirs in a roughly schematic longitudinal section;

FIG. 14 shows a distribution system in a roughly schematic longitudinal section;

FIG. 15 shows a blending system in a roughly schematic longitudinal section.

Figure 16:
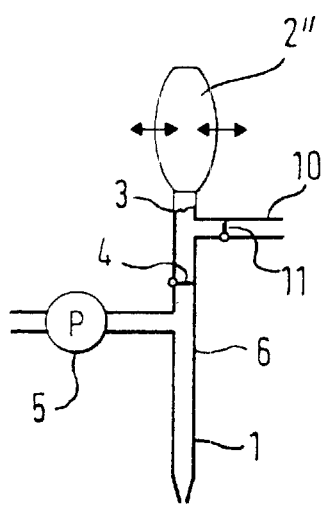
Figure 17:
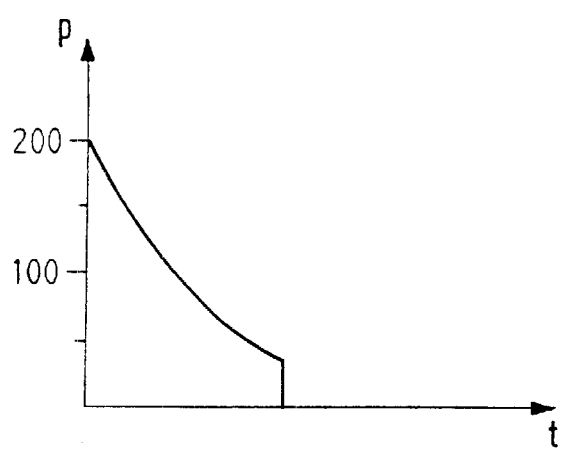
Figure 18:
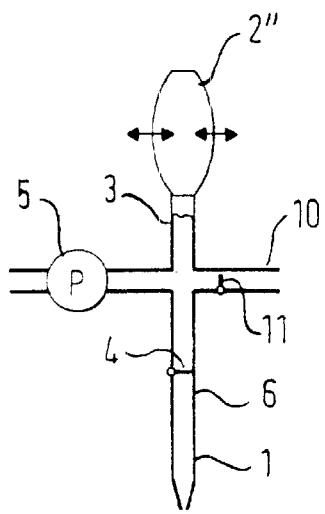
Figure 19:
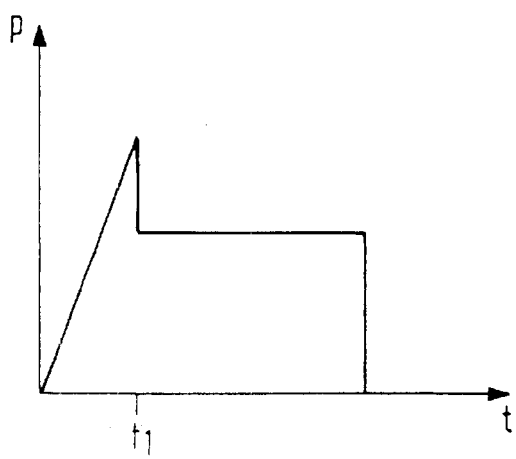
Figure 20:
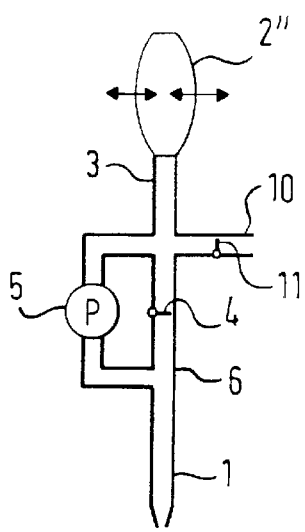
Figure 21:
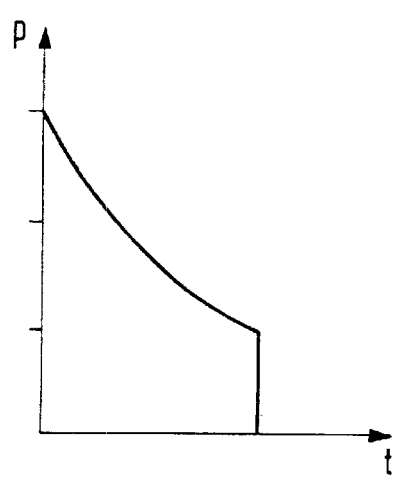
Figure 22:
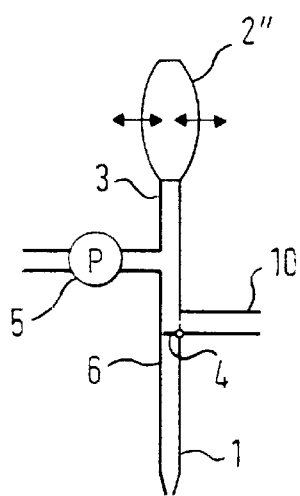
Figure 23:
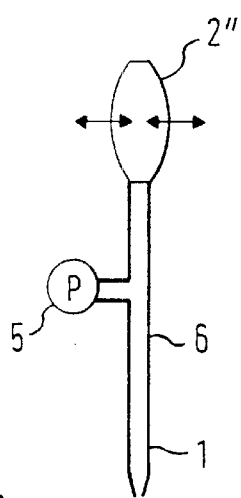
Figure 24:
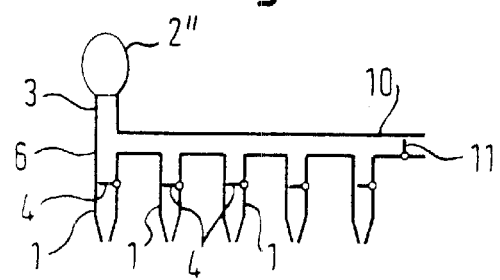

FIG. 16 shows the air cushion microproportioning system having active-response valves and a pressure sensor on the connecting duct in a roughly schematic illustration;

FIG. 17 shows the time response of pressure while liquid is received by the system of FIG. 16;

FIG. 18 shows the air cushion microproportioning system with the membrane micropump having active-response valves and a pressure sensor on the gas reservoir in a roughly schematic illustration;

FIG. 19 shows the time response of pressure while liquid is received by the system of FIG. 18;

FIG. 20 shows the air cushion microproportioning system with the membrane micropump having active-response valves and a differential pressure measuring device in a roughly schematic illustration;

FIG. 21 shows the time response of pressure while liquid is received by the system of FIG. 20;

FIG. 22 shows the air cushion microproportioning system with the membrane micropump having only one active-response in a roughly schematic illustration;

FIG. 23 shows the air cushion microproportioning system with the membrane micropump having no valve means in a roughly schematic illustration;

FIG. 24 shows the air cushion microproportioning system with the membrane micropump and with several liquid reservoirs connected in parallel.

In the discussion of various embodiments which follows, identical features are indicated by identical reference numbers. In lieu of the micropumps referred to, other micropumps which are available or will yet be developed are suited.

1. General

The embodiments are based on the considerations and objectives below:

Extremely small liquid volumes are proportioned by using the microsystem technology. To attain a low imprecision in proportioning and a high speed, microfluid components are employed which meet high demands to the dynamics of time and the discharge rate.

All of the embodiments are based on air cushion displacement with a pulse-like gas discharge at a negative or positive pressure onto the liquid volume being proportioned with the liquid exclusively being in a contact with a liquid reservoir 1 which specifically can be designed as an exchangeable pipette tip.

Figure 1:
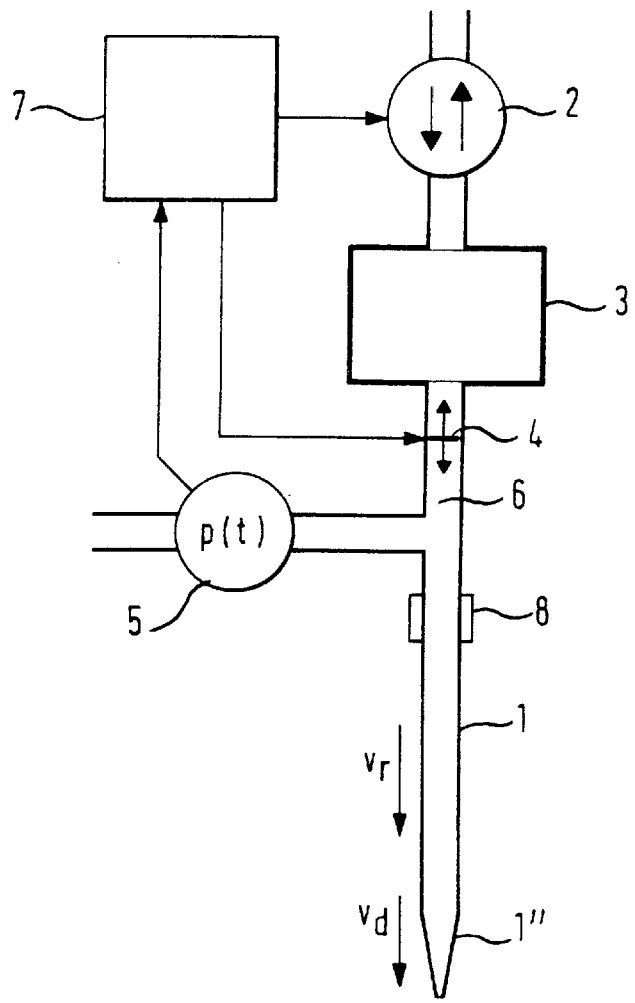

The principle is explained with reference to the embodiment of FIG. 1: A liquid reservoir 1 is connected to a micropump 2 (e.g. a membrane micropump). After a negative pressure or positive pressure is built up by means of the membrane micropump 2 in a gas reservoir 3 the reservoir is abruptly connected to the liquid reservoir 1 via valve means 4. At this point, the volume of the gas reservoir 3 may approximately correspond to the volume of the liquid reservoir 1 so that if the pressure is compensated with twice the volume the positive or negative pressure will be reduced merely to its half. In contrast to the appearance of a stationary pressure compensation in conventional mechanical air cushion pipettes, hence, there is a dynamic pressure compensation here by switching the valve means 4 between a gas reservoir 3 and a liquid reservoir 1.

In addition, a dynamic regulation of the pressure is effected in the gas displacement system. To this effect, according to FIG. 1, a pressure sensor 5 is joined to a connection channel 6 between the gas reservoir 3 and the liquid reservoir 1. The reception and discharge of liquid before the stationary pressure equilibrium is reached is stopped via the switch-over of the valve means 4. The above-mentioned operations are controlled by a proportioning control 7, which may comprise a controller for pressure regulation.

In the embodiments, the reception and discharge of liquid is not determined by time-dependent inertia forces of the liquid mass moved, but is determined by frictional forces which are influenced by the viscosity and flow profile of the liquid. Such frictional forces may substantially be limited to a region 1" of the liquid reservoir 1 in order to avoid too large a pressure drop.

Figure 2:
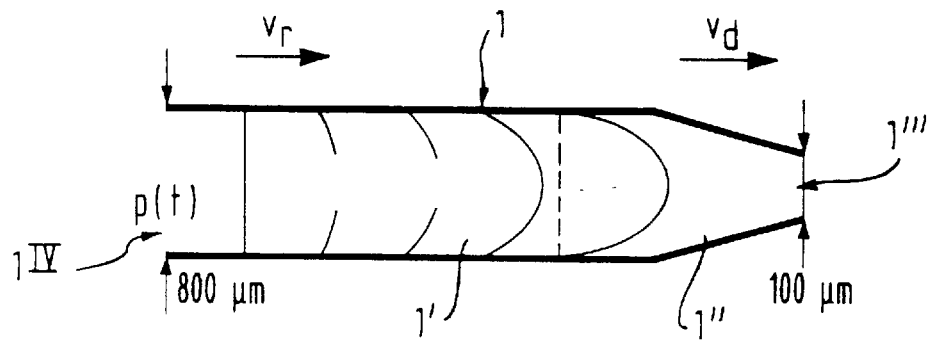

According to FIG. 2, this may be accomplished by the fact that the liquid reservoir 1, adjacent to a storage space 1', has a nozzle 1" with an outlet port 1'" as a liquid passage to generate an speed increase ratio between the storage space 1' and the nozzle 1". This fluidic increase ratio, on one hand, serves for producing a speed which is sufficiently large for discharge in an open jet at a flow speed of abt. 1 to 2 m/sec in 1". On the other hand, it serves for avoiding too high a discharge pressure in the storage space 1' which, for example, may be formed in a capillary. In addition, the increased friction in the nozzle 1" may support the instantaneous stoppage of liquid reception and discharge when the negative pressure or positive pressure is instantaneously relieved on the gas passage $1^{IV}$.

For instance, membrane micropumps 2 are currently capable of generating a gas pressure of about 300 to 500 mbar. This one is reduced, e.g. is cut back to its half, during pressure compensation from a gas reservoir 3 into a liquid reservoir 1. For liquid discharge in an open jet from a liquid reservoir 50 mm in length where the nozzle diameter is 0.1 mm, a gas positive pressure of about 100 mbar will result in a volume flow of about 25 $\mu$l/sec.

The diameter of the outlet 1'" of the nozzle 1" is determined by the volume flow which results from a given pressure. This volume flow is determined by the discharge rate of the membrane micropump 2, on one hand, and the dynamics of time of the control circuit, on the other. Accordingly, the course of cross-section of the liquid reservoir in the nozzle region is directly correlated with the delivery characteristics of the membrane micropump.

The time response of the control during reception is illustrated by the following exemplary calculation: A pressure differential of abt. 50 mbar produces a volume flow of 7 $\mu$l/sec (Aqua Bidest) in a nozzle 100 $\mu$m in diameter, 1 mm in length and a speed increase ratio $v_r/v_d$ of 64 (where $v_r$ is the speed in the storage space next to the nozzle and $v_d$ is the speed in the outlet port of the nozzle). Hence, a volume of 1 $\mu$l is received within 143 ms. An accuracy of 1% is corresponded to by a volume increment of 10 nl, which is received within 1.4 ms. Hence, proportioning a volume of 1 $\mu$l at an accuracy of 1% presupposes a dynamics of time of all components and also a pressure compensation response in the dead volume (i.e. the gas cushion) of the system in the millisecond range.

Components of the microsystem technology are capable of meeting the above demand to the dynamics of time, particularly if these components are interconnected by means of a microfluidic board in an integral, planar way of construction (closed channels; SMD technology, i.e. "surface mount device" technology).

Since the reception of liquid is performed by the speed-determining nozzle 1" in a way approximately proportional to the pressure differential and at a constantly high speed influences such as the alignment of the nozzle 1" (e.g. because it is held by hand) and wetting effects are negligible in contrast to the stationary pressure compensation at a transient and, hence, evanescent pressure differential. In the inventive reception mechanism, however, the frictional forces generate a liquid motion dependent on viscosity. This, however, may inherently be measured and taken into account by the proportioning microsystem and, therefore, is automatically compensated by this system (see para 2). Differences in viscosity which are substantially larger may be compensated by an increase in the negative or positive pressures in order to avoid longer periods of time in reception and discharge so that a single design of the liquid reservoir 1 can cover a viscosity which is 5 to 10 times as wide. For ranges of viscosity going beyond it, liquid reservoirs 1 may be employed the nozzle cross-sectional area of which scales with viscosity in order to provide essentially equal flow and pressure conditions.

Advantageously, the pressure sensor 5 may also be employed to detect the contact of the liquid reservoir 1 with the liquid. Here, a permanent stream of gas is expelled out of the liquid reservoir 1 by means of the pump 2. As soon as the outlet 1'" contacts the surface the pressure will rise in the liquid reservoir 1. This rise in pressure is detected by the pressure sensor 5 and is employed to initiate the reception of volumes.

To avoid errors in volume reception due to a small gas bubble which has built up at the outlet port 1'" the positive pressure built up may either be relieved via a ventilation connection (cf. No. 10 in FIG. 5) or the stream of gas may be maintained until the gas bubble formed pearls away. The pearl-away, in turn, entails a jump in pressure which can be detected and may be employed to initiate the reception of a volume.

It is preferred that the nozzle 1" or the whole of the liquid reservoir 1 be equipped with a liquid-repellent surface so that high capillary effects make possible a reception of liquid which does not depend on the depth of immersion. Thus, a capillary depression of abt. 15 mbar corresponds to a depth of immersion of about 0.15 m, with no reception of liquid. In addition, a liquid-repellent surface enables the liquid to be discharged without any residue because otherwise an adhesion of a residual volume will be caused by capillary forces in the nozzle 1".

The liquid reservoir 1 with the nozzle 1" can be realized, in particular, by pulled-out glass capillaries (e.g. of a length of 50 mm) which may be coated with silicone in an immersion process to make them hydrophobic. Preferably, capillaries manufactured from plastic such as PP, PC, PS may be employed, which exhibit the required nozzle geometries by undergoing injection micro-moulding processes, but also by succeeding machining operations (e.g. laser drilling processes).

2. Controlled Pulse Pressure Method

The dynamic process of receiving and discharging liquid while regulating the pressure determining it will now be explained in greater detail. According to FIG. 1, the pressure in the gas displacement system is measured by means of a pressure sensor 5 and the pressure is regulated by the proportioning control 7 via the pumping rate of the membrane micropump 2 (which is a membrane micropump here), i.e. via the gas volume flow delivered thereby.

2.1 Mode of Operation of the Control Circuit During Reception

A constant negative pressure in the liquid reservoir 1 causes a time-constant volume flow of liquid reception. The membrane micropump 2 compensates the negative-pressure loss in the control circuit which arises from reception and is measured by the pressure sensor 5.

Figure 3A:
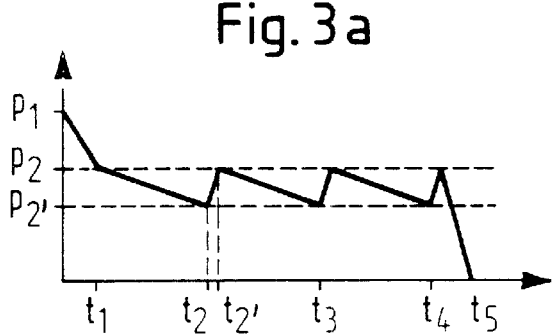

According to FIG. 3a, the pulse-like application of a negative pressure to the liquid reservoir 1 at a defined start of time $t_1$ causes a reception, specifically at a very low imprecision. The membrane micropump 2 is actuated by the control 7 in such a way that the pressure in the liquid reservoir 1 essentially maintains the value $p_2$ (see para 2.2) at any time. The pumping rate, along with the known, pressure-dependent discharge rate of the membrane micropump 2, if integrated over time, provides for the gas volume pumped thereby and, accordingly, the liquid volume received in the liquid reservoir 1. At the same time, the time response of liquid reception in the liquid reservoir 1 is a measure of the viscosity of the liquid received.

Hence, the membrane micropump 2 functions as a volume detector in this control circuit because the gas volume delivered thereby is converted into the liquid volume delivered. Therefore, coupling the liquid volume received and the volume detection by the membrane micropump 2 in combination with the pressure sensor 5 allows of a reception independent on the volume of the liquid reservoir 1, which makes harmless tolerances in manufacture. Since varying flow conditions will only influence the duration of the proportioning process the liquid volume received or discharged does not depend on viscosity, tolerances in the nozzle diameter or further parameters varying the flow.

Figure 3B:
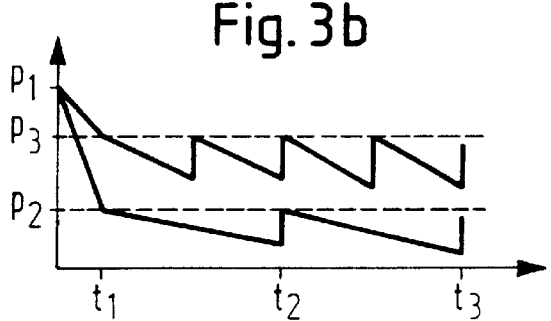
Figure 3C:
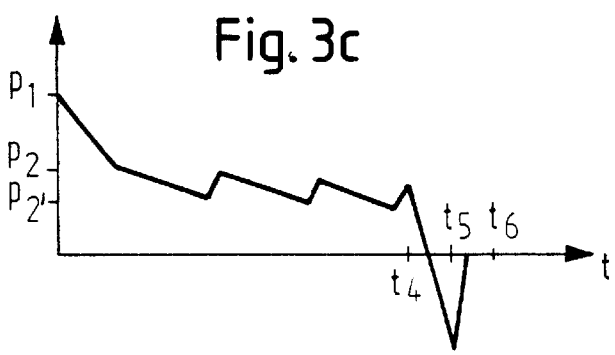
Figure 4:
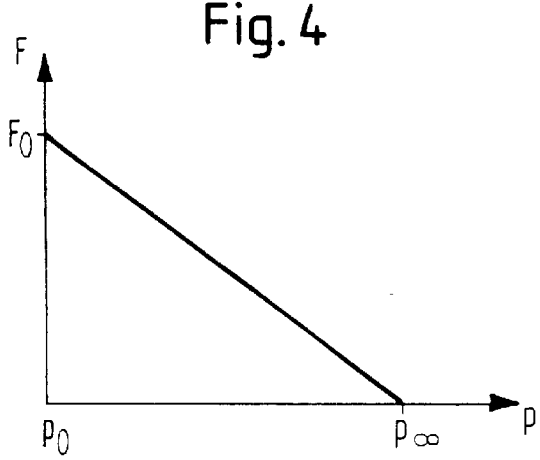
FIG. 4 shows the dependence of the discharge rate on the counterpressure of a typical membrane micropump in a discharge rate-pressure diagram.

The incremental discharge characteristic of the membrane micropump 2 causes the liquid volume being received and the accuracy thereof to be dependent on the pressure, pump stroke, and pumping frequency. The pumping rate F of the membrane micropump 2 which is dependent on the pressure p (cf. FIG. 4), for example, is determined by converting it into a known volume in an initialization process via a pressure rise method. The viscosity determined by the pressure drop in time for each reception process proportionally passes into the duration of reception and discharge at a predetermined pressure $p_2$. For equal reception and discharge times. therefore, e.g. if viscosity is doubled, an appropriate reduction in pressure or increase in pressure may be effected, e.g. from $p_2$ to $p_3=2 \times p_2$ (cf. FIG. 3) and, in case of need, a series connection of membrane micropumps may be interposed to this effect.

The stoppage of liquid following a defined volume reception after $t_4$ is performed by a pulse-like negative-pressure relief against the normal atmosphere between $t_4$ and $t_5$ (cf. FIG. 3a). The frictional forces which are relatively high as compared to the inertia forces cause an immediate stoppage with a liquid breakaway in the liquid reservoir 1. As a support, a negative-pressure pulse may additionally be interposed by a sucking micropump between $t_5$ and $t_6$ (cf. FIG. 3c). Any afterrun of liquid due to capillary forces may successively be prevented by an appropriate negative pressure.

2.2 Pressure-time Response During Reception

According to FIG. 3a, there will be a pressure compensation between the gas reservoir 3 and the liquid reservoir 1 up to a time $t_1$. Because the volumes and the channel lengths are small pressure compensation takes place in the sub-millisecond range and, therefore, is sufficiently fast. The pressure $p_2$ which adjusts itself at $t_1$ in the system is adapted to the liquid volume being received and the viscosity of the liquid. Thus, the negative pressure $p_2$ is lower if the liquid volume being received is smaller in order that the flow rate or speed of reception be reduced and the regulation in time and, thus, the accuracy in volume reception be maintained. The suction of the liquid causes the pressure to drop to a bottom pressure threshold $p_2$ at the time $t_2$. The space of time for this pressure drop is proportional to the viscosity of the liquid. Subsequently, there is a compensation of the pressure drop by an incremental stroke of the pump, i.e. by one or several membrane strokes of the membrane micropump 2. Compensation is completed when the pressure $p_2$ has been reached at a time $t_{2'}$. As viscosity will only influence the course of time because of this mechanism the volume being received does not depend on viscosity.

Subsequently, this operation will repeat several times with a compensation of the pressure drop always being effected by an incremental stroke of the pump at the times $t_3$ and $t_4$.

The strokes of the pump are summed up and liquid reception is stopped once the adjusted pumping volume is reached.

2.2 Discharge

The discharge of liquid is similar to the reception thereof: A constant positive pressure produces a discharge at a known viscosity and a known geometry of the liquid reservoir 1 which may have direction-dependent flow resistances which, however, are known. Regulation may be effected like during reception in such a way that the membrane micropump 2 compensates the pressure drop. However, regulation in time is possible as well by resorting to data that the system acquires during liquid reception.

A pulse-like application of a positive pressure to the liquid reservoir 1 after t, causes an immediate formation of an open jet. Discharge in the pipetting mode is effected by a complete blow-out with no stoppage of liquid. Then, a determination of the pumping volume may be dispensed with if the liquid volume received has been determined and a complete blow-out is ensured, e.g. by a control in time.

Since a minimal pressure generally requires to exist for discharge in an open jet the control circuit should possibly be designed with a time control in the dispensing mode (for small liquid volumes) for higher dynamics of time. The stoppage of liquid following a defined volume reception after $t_4$ is performed in a similar way by a pulse-like positive-pressure relief against the normal atmosphere: The frictional forces which are relatively high as compared to the inertia forces cause an immediate stoppage via a liquid breakaway.

Limits are set to the minimal volume discharged in the discharge mode because of inherent surface tensions of the liquid at a volume of abt. 100 nL (with time for discharge under open-jet conditions being abt. 4 ms here). The discharge of liquid volumes which are even smaller is questioned here inasmuch as the kinetic energy existing at an open-jet speed of from 1 to 2 m/sec approximatively corresponds to the surface energy of the droplets.

3. Some Beneficial Effects

The pulse pressure method avoids a non-defined formation of droplets because a continuous open jet will form immediately after $t_1$ at the pressure $p_2$.

A defined breakaway of droplets during the dispensing operation is achieved, in particular, by a sudden relief of the positive or negative pressure via a fluidic increase ratio.

The buildup of a negative or positive pressure may take place, for example, during a transportation, reception or discharge operation, particularly in order to avoid a delay in further proportionings.

A low-level imprecision is achieved because of the defined start of time $t_1$ for reception.

Nor is such incorrectness correlated with the diameter of the outlet port of the liquid reservoir or the pipette tip.

The volume received or discharged is limited only by the inaccuracy in measuring, specifically the measuring inaccuracy of the pressure sensor.

The speeds of reception and discharge are scaled so as to be approximatively proportional to the viscosity and pressure.

Different cross-sections of the nozzle outlet (e.g. from 100 to 300 $\mu$m) can be employed for different viscosities. Under equal pressure conditions, the nozzle diameter requires to be increased from 100 $\mu$m to 180 $\mu$m at a viscosity higher by 10 times and from 100 $\mu$m to 320 $\mu$m at a viscosity higher by 100 times if the speeds of reception and discharge are intended to remain constant.

A liquid reservoir which has a nozzle of determined dimensions enables to proportion different liquids the viscosities of which are distinguished by 5 to 10 times.

4. More Embodiments

FIG. 5 shows an embodiment wherein a liquid reservoir 1 includes a releasable joint 8 to a connection channel 6 of a gas displacement system onto which a negative-pressure gas reservoir 3 or a positive-pressure gas reservoir 3' is alternatively adapted to be changed over via a 3/2-way valve 4. Connected to the gas reservoir 3 via a filter 9 is the suction end of an unidirectional membrane micropump 2, the pressure end of which is led to the environment. Connected to the gas reservoir 3' is the pressure end of an unidirectional membrane micropump 2" which draws in ambient air via a filter 9'.

The connection channel 6 has laterally connected to the environment a ventilation channel 10, which is adapted to be closed and opened by means of a 2/2-way valve 11.

The connection channel 6 also has laterally connected thereto a pressure sensor 5 which detects the differential pressure with respect to the environment.

A proportioning control 7 controls the membrane micropunmps 2, 2', the valves 4,11, and processes the signal of the pressure sensor 5.

This system operates according to the regulated-pulse pressure method. For a suction of liquid, a negative pressure is initially built up by means of the membrane micropump 2 in the gas reservoir 3 in a position b of the valve 4. Then, the valve 4 is changed over to the position a with the valve 11 closed so that the negative pressure is abruptly applied to the liquid reservoir 1 which draws in liquid through the nozzle 1". During suction, the pressure sensor 5 continually determines the pressure in the gas displacement system and the proportioning control 7 regulates it to a determined value via the membrane micropump 2. Suction is abruptly terminated by opening the valve 11. turning the membrane micropump 2 off and, if necessary, switching the valve 4 over to position b.

For a discharge of liquid, the valve 4 is initially brought to position a and a positive pressure is built up in the gas reservoir 3' by means of the membrane micropump 2'. The positive pressure is applied to the liquid reservoir 1 in a pulse-like manner by switching the valve 4 over to position b with the valve 11 closed. As a result, the liquid received is discharged from the nozzle 1' in an open jet. At this point, the positive pressure is permanently determined by means of the pressure sensor 5 and is regulated by the proportioning control 7 to a determined value. Upon discharge of the desired liquid volume, the valve 11 is opened again, the membrane micropump 2' is turned off, and, if necessary, the valve 4 is simultaneously changed over to the position a in order to relieve the positive pressure with respect to the environment.

The embodiment of FIG. 6a, in contrast to the one of FIG. 5, only has a 3/2-way valve 4 which is seated in the connection channel 6 at the junction of the ventilation channel 10. The pumps 2, 2' are connected to a common gas reservoir 3. The pressure sensor 5 is also connected thereto.

Once the valve 4 is in the position a the gas reservoir 3 may be charged. To this end, the pumps 2, 2' each have the property of maintaining the pressure built up by the respective other pump 2', 2 in the gas reservoir 3. The pressure in the gas reservoir 3 is regulated via the pressure sensor 5 and via a proportioning control, which is not shown.

For a suction or discharge, the valve 4 is brought to position b. It is switched back to position a for a termination of suction or discharge.

This embodiment involves a relatively low expenditure because only one valve means 3 is employed. The expenditure could be reduced even more by the fact that a single, directionally operating pump 2 is employed in lieu of the pumps 2, 2'.

If no unidirectional pumps 2, 2', which could maintain the pressure, are available for the embodiment of FIG. 6a a device 2" with a 3/2-way valve can be interposed downstream of the outlet of the pump 2 and the inlet of the pump 2" according to FIG. 6b. Depending on the switching position of the 3/2-way valve, the pump 2 or 2' is joined to the environment and the other one is blocked, which ensures that the pressure is maintained as desired.

If no 3/2-way valves are available for the valve means 4 or the device 2" these can also be substituted for by two 2/2-way valves each.

The embodiment of FIG. 7 is distinguished from the one of FIG. 5 by the fact that there are two 2/2-way valves 4', 4" in lieu of a 3/2-way valve 4. Moreover, a pressure sensor 5 is interposed between the gas reservoirs 3, 3'.

The negative pressure or positive pressure may be applied to or removed from the liquid reservoir 1 by switching the valves 4', 4", and 11. The pressure in the respective gas reservoir or 3' is measured by means of the pressure sensor 5 with a reference being given to the ambient pressure by venting the respective other gas reservoir 3', 3 via the pump 2', 2 connected thereto.

The embodiment of FIG. 8 is distinguished from the preceding one particularly by the configuration of the gas displacement system. This one has a single, unidirectional membrane micropump 1 which is connected to a negative-pressure gas reservoir 3 via a filter 9 at the suction end and is directly connected to a positive-pressure gas reservoir 3' at the pressure end. Each of the gas reservoirs 3, 3' is joined to a connection channel 6 for the liquid reservoir 1 via a 2/2-way valve 4', 4". The negative-pressure gas reservoir 3 has connected thereto a ventilation channel 10 which, in turn, has a 2/2-way valve 11. Both the membrane micropump 2 and filter 9 are shunted out by a further differential pressure sensor 12.

The membrane micropump 2, the valves 4', 4", 11, and the sensors 5, 12 are connected to a proportioning control 7. The illustration of the connections was dispensed with for reasons of an understanding.

A negative pressure is built up in the gas reservoir 3 by actuating the membrane micropump 1. The attainment of the negative pressure desired can be monitored by the pressure sensor 5. The pressure sensor 12 serves for detecting the pumping rate given at the differential pressure. Opening the valve 4' causes the negative pressure to abruptly be changed over onto the liquid reservoir 1. The regulation of the negative pressure is performed as is described above. The valve 11. is opened for a termination of suction.

While the negative pressure is being generated a positive pressure may already be applied to the gas reservoir 3'. In addition, this will be possible by operating the membrane micropump 1 with the valve 11 opened. The attainment of the positive pressure desired can be monitored by the pressure sensor 12. The positive pressure may be abruptly applied to the liquid reservoir 1 via the valve 4" in order to discharge liquid from the liquid reservoir 1. The regulation of the positive pressure is performed as described above. The discharge of liquid is terminated by opening the valves 4', 11.

The embodiment of FIG. 9 is distinguished from the one of FIG. 8 substantially by the valves. Here, there is a 3/2-way valve 4 between the negative-pressure gas reservoir 3, the positive-pressure gas reservoir 3', and the connection 6 to the liquid reservoir 1. Also, a 3/2-way valve 11' is disposed between the gas reservoir 3, the filter 9, and the ventilation channel 10.

A negative pressure is built up in the gas reservoir 3 by causing the membrane micropump 1 to act on the gas reservoir 3 closed by the valve 4 in position b with the valve 11' in position a. Then, the negative pressure will be abruptly applied to the liquid reservoir 1 by switching the valve 4 over to position a. For a stoppage of reception, the valve is brought out of position a and the valve 11" is brought into position b so that ventilation may be effected via the pump 2.

For a buildup of a positive pressure in the gas reservoir 3', the valve 11' is changed over to position b, the valve 4 is brought into position a, and the membrane micropump 1is actuated. For a discharge of the liquid, the valve 4 is changed over to position b. The operation is terminated by opening the valve 11' towards the environment and, if necessary, by changing the valve 4 over to position a.

An inventive system of FIG. 10 can be advantageously realized by means of a microfluid board 13. This is shown in the drawing for a system the structure of which approximately corresponds to the one of FIG. 5. The microfluid board 13 integrates the various channels (e.g. the connection channel 6) and gas reservoirs (e.g. 3, 3'). They are manufactured in at least one board body by an injection moulding or embossing technique and by closing them.

The various components (e.g. the membrane micropumps 2, 2', the valve 4, the pressure sensor 5) are mounted in a hybrid assembly and are welded to each other so that they are directly connected to the channels (e.g. 6) or gas reservoirs (3, 3') in the microfluid board 13.

Furthermore, there are printed electric conductors 14, 14' on the surfaces of the microfluid board 14. The electric/electromechanical components 2, 2', 4, 5 are electrically connected to the printed conductors 14, 14' via a bonding process so that they may addressed via a normalized bus system.

The microfluid board 13 may be connected to an electronic pressure control 7 and an accommodating or fastening device for exchangeable pipette tips via standardized electrical and hydraulic interfaces.

A microfluid board 13, in particular, has the advantage of permitting to minimize the dead volumes of the system. If the negative pressure or positive pressure, while being applied to the liquid reservoir, is intended to drop merely by half its level, namely the volumes of the system which are to be joined to the gas reservoir 3 require to be of approximately the same volume as is the gas reservoir 3. Conventional flexible-tube connections and classico-mechanical pumps and valves are too bulky and too passive. Therefore, the embodiment realized by means of a microfluid board 13 and microsystem technological components is particularly advantageous.

According to FIG. 11, several component-loaded microfluid boards 13 may be disposed in parallel side by side in a normalized grid pitch in order to make possible a multichannel dispensing device. The microfluid boards 13 are joined to liquid reservoirs 1 in the form of pipette tips by means of a transversely directed connection board 15. The connection board 15 comprises continuations 6' of the connection channels 6 with a view to realizing a connection to the liquid reservoirs 1. The grid pitch of the liquid reservoirs 1 may be different from the grid pitch of the microfluid boards 13 in order to maintain the grid pitch, e.g. the one of titration plates. The connection board 15 may be loaded with accommodating and fastening devices to disconnectably attach the liquid reservoirs 1.

The modular structure of a system using microfluid boards 13 and connection boards 15 also makes it possible to implement additional functions such as blending or separating individual volumes in the liquid reservoirs 1. For this purpose, in case of need, the connection board 15 may have additional, intelligent distribution systems which, for example, may have valves. Also, additional pneumatic connections 6" may enable more complex linkups or functions between the various boards 13, 15.

FIG. 12 shows a microfluid board 13 which, via a transversely directed connection board 15, is connected to several liquid reservoirs disposed in parallel. Hence, the reception and discharge of liquid via the parallel liquid reservoirs 1 is caused by a single microfluid board 13. This system may have connection channels 6 in the microfluid board 13 or continuations 6'thereof in the connection board 15 into which microsystem technological valve means are integrated. It is via these valve means that single or several liquid reservoirs are adapted to be purposefully activated.

According to FIG. 13, it is possible to guide the liquid reservoirs 1, in the form of pipette tips, from a magazine in a parallel alignment up to the microfluid board 13. Finally, the pipette tips 1 are adapted to be shifted, in parallel with the microfluid board 13, into a mounting. The system may comprise a LED 17 which can be mounted, for example, on the microfluid board 13 or a connection board 15. By means of the LED, light may be axially coupled, possibly via a radiation reversal, into a gas passage $1^{IV}$ of the pipette tip 1, which is passed through as a bottom hole, in order to exit from the nozzle 1" as a light pointer. The pipette tip serves as a light conductor here. The light pointer may be used as a position indicator for both the nozzle 1" (especially when made of glass) and the proportioning place. This is advantageous, in particular, if the system is designed as a portable unit. In addition, a change measured by a light detector 17' in the reflection response of the light while contacting the surface of the liquid surface may be used for a detection of a liquid contact.

According to FIG. 14, an inventive system may dock a distribution system 18. This one has a feed channel 19 from which a multiplicity n of small side arms 20 are branched off. The n side arms have a nozzle each with an outlet. The inside surface of the distribution system 18 is of a hydrophilic design in the region of the side arms 20 to assist in filling the side arms with liquid. This distribution system 18, by slowly ejecting the liquid received from the tip while avoiding an open jet in the channel 19, enables the liquid to spread into the side arms 20. The inventive application of a positive pressure forms an aid in successively discharging the liquid from the nozzles, possibly in an open jet.

According to FIG. 15, the parallel arrangement of two liquid reservoirs 22, 22' permits both to blend two liquids and to split up the liquid being received by means of gas bubbles. To this end, for the blending process, a liquid previously received therein is discharged from the liquid reservoir 22' and is received in the liquid reservoir 22 at the same time as another liquid is. Since the complete volume from 22' is intended to be received by 22 at least the same volume requires to be received in 22. Subsequently, a third liquid may be received in 22'. Then, a blend of all liquids can be achieved while these are discharged from 22, 22'. In such arrangement, the liquid reservoirs 22, 22' have their outlets 22", 22'" arranged as closely as possible to each other in order to favour a "crossover" of the liquid. They may be combined into a pipette tip and may be designed as a disposable.

Another application of the same liquid reservoirs 22, 22' consists in a split-up of the same liquid in the channel 22 by means of gas bubbles, which split-up is caused by a discharge of air from 22' while the liquid is received therein. In particular, this can favour the operation of a distribution system in FIG. 14 if the individual liquid volumes are smaller than the volume portions in the side arms 20.

It particularly is membrane micropumps which can be employed as micropumps in the aforementioned embodiments. When in a unidirectional design, these may have passive-response valves such as flap valves in both the inlet and outlet. When in a unidirectional design, they may have active-response valves in both the inlet and outlet. In particular, these can be electrically controllable valves such as membrane valves with an piezoelectric actuator.

The actuators may be designed so as to be separated from the membrane micropump or may be integrated in them in a microsystem technology. For example, the membranes of the membrane micropump or the membrane valve can have a support layer and a piezofilm applied thereto. An electric voltage is applied to this piezoelectric actuator via surface contacts on the upper and lower sides of the piezofilm.

A self-filling membrane micropump which is manufactured by the Institut für Mikrotechnik Mainz GmbH, Karl-Zeiss-Strasse 18–20, D-55129 MainzHechtsheim, may particularly be employed as a unidirectional membrane micropump. The membrane micropump in question was presented in the technical paper "A Self-filling low-cost membrane micropump" by K. P. Kämper, J. Döpper, W. Ehrfeldt, and S. Oberbeck in Proceedings of MEMS (Micro Electro Mechanical Systems), Heidelberg, 1998, pp. 432–437. The membrane of this membrane micropump is about 10 mm in diameter.

The embodiments which follow have a membrane micropump with one or several membranes having integrated piezoelectric actuators (membrane piezoelectric flexible member). The membrane piezoelectric flexible member is a twin-type ceramic membrane which if applied to by a voltage bends into a cavity like a spherical cup or moves away from it, depending on what the voltage polarity is. After the voltage is turned off the membrane is caused by elastic restoring forces to return to its initial position. A known membrane micropump of this construction differs from the above unidirectional membrane micropump particularly by the fact that its membrane is abt. 30 mm in diameter. The membrane may be deformed with regard to a cavity which is abt. 70 μm in depth. Moreover, it features a rapid deformation of the membrane (e.g. in the sub-millisecond range).

The valves which are used can be, for example, 2/2-way piezoelectric microvalves (with 10 mm membrane piezoelectric flexible members as the active-action component) of the Forschungszentrum Karlsruhe/Fr. Bürkert.

According to FIG. 16, a membrane micropump 2" of the above described type is connected to a liquid reservoir 1 via a gas reservoir 3 and a connection channel 6. The gas reservoir 3 may also be partially or fully integrated into the volume displacement device 2". The liquid reservoir 1 can be permanently or disconnectably connected to the connection channel 6.

A 2/2-way valve 4 is integrated in the connection channel 6. Further, an ventilation channel 10 which can be closed and opened by means of a 2/2-way valve branches off towards the environment from the connection channel 6. A pressure sensor 5 which measures the pressure differential from the environment is connected between the valve 4 and the liquid reservoir 1.

For the suction of liquid, valve 4 is first closed and valve 11 is opened subsequently. The two membranes of the membrane micropump 2" are driven so as to bend towards each other. Then, valve 11 is closed and the membrane micropump 2" is driven so as to relieve the membranes of pressure or bend them apart. This produces a negative pressure in the gas reservoir 3.

The liquid reservoir 1 is dipped into a liquid at one aperture and the valve 4 is abruptly opened. As a result, the negative pressure causes liquid to be drawn into the liquid reservoir 1. The course of the pressure p above time t can be seen from FIG. 17. The pressure in the system lowers, starting from the maximum negative pressure p while the valve 4 opens. This is monitored by means of the pressure sensor 5. The liquid volume received is calculated from the course of pressure via a gas condition equation. Once the target volume is reached the valve 11 is opened so that liquid reception is stopped. Capillary forces retain the liquid in the liquid reservoir 1. In case of need, the membranes may be caused to support pressure compensation if they are slightly bent together.

To relieve the membranes of pressure, the valves 11, 4 can be opened and the pressure of the membrane micropump 2" can be turned off. For liquid discharge, however, it is advantageous if the membranes are bent apart when discharge begins.

For liquid discharge, the valves 4 and 11 are closed. Subsequently, the membranes are bent towards each other so as to produce a positive pressure in the gas reservoir 3. For discharge, the valve 4 is abruptly opened so that the positive pressure causes the liquid to be expelled from the liquid reservoir 1. The course of pressure during liquid discharge is monitored by means of the pressure sensor 5. The volume discharged, in turn, is calculated therefrom and the valve 11 is abruptly opened once the target volume is reached. The valves 4 and 11 may be opened afterwards in order to relieve the membranes of pressure.

Moreover, the course of pressure compensation in time may be used to determine the viscosity of the proportioned liquid.

According to FIG. 18, the pressure sensor 5 is connected to the gas reservoir 3 in contrast to FIG. 16. The valves, while drawing in and discharging liquid, are generally driven as in FIG. 16. In the microproportioning system of FIG. 16, however, the pressure in the gas reservoir is adjusted to a value which is approximately constant by actuating the membrane micropump 2" and driving the valves 4, 11. Namely, if the negative pressure or positive pressure has dropped to a certain level during suction and discharge valve 4 is closed and valve 11 is opened and the membranes are bent towards each other and away from each other, respectively. Subsequently, valve 11 is closed and the membranes are bent apart to produce a negative pressure and are bent together to produce a negative pressure. Then, valve 4 is opened and suction or discharge continues. This operation is performed so fast that there is an approximately constant pressure in the gas reservoir.

This is illustrated in FIG. 19. Accordingly, if reception is effected a negative pressure p is built up in the gas reservoir 3 up to a time $t_1$. If the valve 4 is opened the pressure drops abruptly to a reduced level. In the example, the membrane micropump 2" is reregulated because of the negative pressure which was measured by the pressure sensor 6 so that the negative pressure p remains approximately constant throughout the reception of liquid. Since the volume displaced by the membrane micropump 2" is known the liquid volume received may be determined. At this point, the viscosity of the liquid received may be determined as well.

During liquid discharge, the discharge pressure may be regulated in a similar way so that the liquid volume discharged can be determined via the displacement volume known of the membrane micropump 2".

FIG. 20 differs from FIGS. 16 and 18 in that the pressure sensor 5 bridges the valve 4. The volume of the liquid received or discharged may be regulated as was explained for FIG. 16. In addition, the volume of the liquid reservoir 1 may be calculated from the relief of the pressure p (cf. FIG. 21) in the membrane micropump 2". To this end, the pressure is measured, prior to pressure relief, through the liquid reservoir 1 open to the environment against the ambient pressure. Further, the pressure is measured against the ambient pressure after the valve 11 is opened and after the liquid reservoir 1 is dipped into the liquid.

Alternatively, a pressure sensor each on the liquid reservoir 1 and in the membrane micropump 2", which replaces the sensor 5 bridging the valve 4, may measure the pressure in separate ways.

FIG. 22 differs from FIG. 18 in that there is a 3/2-way valve 4 instead of two 2/2-way valves 4/11. The 3/2-way valve 4 may close both the connection channel 6 and ventilation channel 10. The liquid reservoir 6 merely is in an indirect contact to be made via the membrane micropump 2" with the ambient pressure here. Thus, the erratic pressure compensation with the ambient pressure primarily takes place via the appropriately opposed control of the membranes. The liquid volume is regulated as is shown in FIG. 18. The pressure sensor 5 may also be fitted on the connection channel 6 as is shown in FIG. 16 so that volume regulation is done accordingly.

According to FIG. 23, the membrane micropump 2" may generally be connected to the liquid reservoir 1 through a connection channel 6 even with no valve means because the large volume displaced and the rapid time response make it possible to displace the gas in a pulse-like manner for the purpose of liquid reception and discharge even without pressure accumulation or valve means.

When liquid is received or discharged its volume may be regulated via a pressure sensor 5 which is connected to the connection channel 6. For volume regulation according to FIG. 16, it is necessary to know the pumping characteristics/ the displacement characteristics of the membrane micropump 2" in response to the pressure and dead volume. This is not the case for a volume regulation according to FIG. 18.

Just for an embodiment according to FIG. 23, it is beneficial to increase the volume displaced by using a multiplicity of membrane piezoelectric bending members.

According to FIG. 24, a membrane micropump 2" is connected to several parallel liquid reservoirs 1 via a gas reservoir 3 and parallel connection channels 6. The connection channels 6 have arranged therein active-response valves 4. Furthermore, an ventilation channel 10 in which an active-response valve 11 is arranged is branched off from the gas reservoir 3. The reception and discharge of liquid may be accomplished with no pressure sensor if the pumping rate is known for the membrane micropump 2". In addition, operation according to FIG. 16, 18 or 20 is possible with a need to complete pressure sensors 5 in a suitable arrangement. The liquid reservoirs 1 may be used in parallel or individually.

What is claimed is:

1. A gas cushion proportioning microsystem to proportion liquid volumes in the microliter and sub-microliter range, comprising:

a liquid reservoir (1) including a storage space (1') for the liquid being proportioned the boundary line of which is broken through by an outwardly leading liquid passage (1") and a gas passage ($1^{IV}$), a gas displacement system joined to the gas passage ($1^{IV}$), comprising a gas displacement system which has a micropump (2) to pump a gas and a connection (6) to the gas passage ($1^{IV}$), and a proportioning control (7) disposed in an operative communication with the micropump (2) and the valve means (4) to close the valve means (4) and generate a negative pressure or positive pressure in the gas reservoir (3) and to apply the negative pressure or positive pressure from the gas reservoir (3) to the liquid reservoir (1) by actuating the valve means (4) in order to receive liquid in the storage space (1') through the liquid passage (1") or to deliver it from said space.

2. The system according to claim 1 in which the gas displacement system has a gas reservoir (3) which is connected to the micropump (2).

3. The system according to claim 1 wherein the gas displacement system has valve means (4) to open and close the connection (6) with the gas passage ($1^{IV}$) and the micropump (2) and the valve means (4) are in an operative communication with the proportioning control (7) to close the valve means (4) and generate a negative pressure or positive pressure by actuating the micropump (2) and to apply the negative pressure or positive pressure to the liquid reservoir (1) by actuating the valve means (4).

4. The system according to claim 1, having a pressure sensor (5) to detect the pressure in the gas displacement system with which the proportioning control (7) is in an operative communication in order to determine the liquid volume received or discharged or to control it to a preset value.

5. The system according to claim 4, wherein the proportioning control (7) regulates the negative pressure or positive pressure in the gas displacement system in drawing in or dispensing liquid by detecting the pressure prevailing therein by means of the pressure sensor (5) and controlling the pumping rate or the volume displaced by the micropump (2) to a preset value or course of values, and determines the liquid volume received or discharged via the pumping rate or the volume displaced by the micropump (2) or controls it to a present value.

6. The system according to claim 5, wherein the proportioning control (7) determines or controls the liquid volume received or discharged via an integration of the pumping rate of the micropump (2) in time.

7. The system according to claim 5 wherein the proportioning control (7) determines and/or takes account of data on the pressure dependence of the pumping rate of the micropump (2).

8. The system according to claim 1 wherein the proportioning control (7) for receiving or dispensing liquids of differing viscosities actuates the micropump (2) differently in order to generate different negative pressures or positive pressures in the gas displacement system.

9. The system according to claim 1 wherein the proportioning control (7) determines the viscosity of the liquid being proportioned via the time response of the control of the negative or positive pressure.

10. The system according to claim 1 wherein the proportioning control (7) controls the discharge of a liquid volume to a preset value by actuating the micropump (23) on the basis of data on the timed course of reception of a determined liquid volume in time.

11. The system according to claim 1 including further valve means (11) to open or close a ventilation connection (10) of the gas displacement system to the environment and wherein the proportioning control (7) is in an operative communication with the further valve means (11) in order to stop the reception or discharge of liquid by relieving the negative pressure or positive pressure by means of the further valve means (11) while opening the ventilation connection (10) to the environment by means of the further valve means (11).

12. The system according to claim 1 wherein the cross-section of the liquid passage (1") or the path of which is dimensioned such as the proportioning control (7) controls the positive pressure in the gas reservoir (3) by actuating the micropump (2) in such a way that the liquid in the liquid passage (1") reaches a speed which is large enough to cause it to exist to the outside in an open jet.

13. The system according to claim 1 wherein the cross-section of the liquid passage (1") and/or the storage space (1') is dimensioned such that if the negative pressure or positive pressure is relieved the frictional forces outweigh the inertia forces of the moved liquid in order to suppress any farther reception or discharge of liquid.

14. The system according to claim 1 wherein the liquid passage (1") is configured as a nozzle.

15. The system according to claim 1 wherein the proportioning control (7), if the negative pressure or positive pressure is relieved, controls a micropump (2) connected to the gas displacement system and/or a valve means in a communication with a gas reservoir in such a way that a negative or positive pressure counteracting the inertia forces is applied.

16. The system according to claim 1 wherein the cross-section of the liquid space (1') or the path of which is dimensioned such and the proportioning control (7) controls the positive pressure in the gas reservoir (3) by actuating the micropump (2) in such a way that the liquid in the liquid space (1') does not exceed a value of speed which would lead to a flow separation in the storage space (1') and to a stay of residual liquid on the wall of the storage space (1').

17. The system according to claim 1 wherein the proportioning control (7) causes gas to exit from the liquid passage (1") by actuating the valve means (4) and/or actuating the micropump (2) and identifies an immersion into a liquid by way of a change of the pressure detected by the pressure sensor (5).

18. The system according to claim 17, wherein the proportioning control (7) automatically initiates the reception of liquid in the liquid reservoir (1) because of an identified dipping operation.

19. The system according to claim 1 wherein the liquid reservoir (1) has liquid-repellent surface characteristics at the inside and/or outside in regard of the respective liquid being proportioned.

20. The system according to claim 1 wherein the liquid reservoir (1) is a pipette tip.

21. The system according to claim 1 wherein the liquid reservoir (1) is made of glass and/or plastic.

22. The system according to claim 1 wherein the liquid reservoir (1) is disconnectably joined to the connection (6) with the gas reservoir (3).

23. The system according to claim 1 wherein the liquid reservoir (1) is a disposable.

24. The system according to claim 1 including a micropump (2) the inlet of which is joined to the connection (6) via a negative-pressure gas reservoir (3) and the valve means (4) and which includes another micropump (2') which is joined to the connection (6) via a positive-pressure gas reservoir (3') and the valve means (4).

25. The system according to claim 1 including a micropump (2) the inlet of which is joined to the connection (6) via a negative-pressure gas reservoir (3) and valve means (4') and the exit of which is joined to the connection (6) via a positive-pressure gas reservoir (3') and valve means (4").

26. The system according to claim 1 including one micropump (1) adapted to pump at least bidirectionally and/or at least one micropump (1, 1') adapted to pump unindirectionally.

27. The system according to claim 1 wherein at least one micropump (2) is a membrane micropump.

28. The system according to claim 27, wherein the membrane micropump (2") is with no value or has passive-response or active-response value.

29. The system according to claim 28, wherein the active-response value of the membrane micropump (2") are value means (4, 11) in the connection (6) and/or in a ventilation connection (10).

30. The system according to claim 28, wherein the membrane micropump (2") and/or the active-response value (4, 11) has/have at least one membrane with integrated piezoelectric actuator.

31. The system according to claim 1 wherein the micropump (2) is bridged by a differential pressure sensor (13).

32. The system according to claim 1 wherein the micropump (2) delivers the gas through a filter (9).

33. The system according to claim 1 wherein several micropumps (2) are connected in parallel side by side.

34. The system according to claim 1 wherein the ventilation connection (10) is branched off from the connection (6) or the gas reservoir (3).

35. The system according to claim 1 wherein the connection (6) has a connection channel and/or the ventilation connection (10) has a ventilation channel.

36. The system according to claim 1 wherein the connection (6) at the most has the same flow resistance for the gas as a nozzle (1") of the liquid reservoir (1) has for the liquid.

37. The system according to claim 1 wherein the micropump (2) and/or the valve means (4) and/or the further valve means have a passive-response and/or active-response (11) flap valves.

38. The system according to claim 1 wherein the pressure sensor (12) determines the pressure in the connection (6).

39. The system according to claim 1 wherein the micropump (2) and/or the valve means (4) and/or the further valve means (11) and/or the pressure sensor (129 and/or the gas reservoir (3) and/or the connection (6) and/or the ventilation connection (10) and/or the liquid reservoir (2) and/or the proportioning control (7) are disposed on a microfluid board (13).

40. The system according to claim 1 wherein at least one microfluid board (13) is joined to a connection board (15).

41. The system according to claim 1 wherein several gas displacement systems are disposed in parallel and are connected to at least one liquid reservoir (2) and/or wherein several liquid reservoirs (1) are disposed in parallel and are connected to at least one gas displacement system.

42. The system according to claim 1 wherein the liquid reservoir has a distribution system (18) for liquid including a feed channel (19) and several side arms (20) which are branched off therefrom.

43. The system according to claim 1, including adjoining liquid reservoirs (22, 22') with adjoining outlets (22", 22") and at least one gas displacement system associated with the liquid reservoirs (22, 22') with at least one proportioning control (7).

44. The system according to claim 43, wherein the proportioning control (7) controls the simultaneous discharge of a fluid from one liquid reservoir (22') and the reception of a fluid in the other liquid reservoir (22) and/or the simultaneous discharge of a fluid from the two liquid reservoirs (22, 22').

45. The system according to claim 44 wherein the spacing between adjoining liquid passages (1") corresponds to the spacing between adjoining mountings of a microtitration plate.

46. The system according to claim 1 designed as a portable unit or stationary unit.

47. The system according to claim 1 including a light beam aligned in parallel or coaxially with the liquid passage (1").

48. The system according to claim 47, which has a light sensor (17') connected to the liquid reservoir (1) via an optical path to detect a liquid contract of the liquid reservoir (1).

49. The system according to claim 1 including a magazine and feeding and/or dropping means for exchangeable liquid reservoirs (1).

50. A multi-channel air cushion proportioning microsystem, comprising several parallel systems according to claim 1.

51. The system according to claim 4, wherein the proportioning control (7) detects the negative pressure or positive pressure in the gas displacement system in drawing in or dispensing liquid by means of the pressure sensor (5) and determines the liquid volume received or discharged by resoting to a gas condition equation, or controls it to a present value.

* * * * *